(12) United States Patent
Brooks

(10) Patent No.: US 10,578,159 B1
(45) Date of Patent: Mar. 3, 2020

(54) SELF-METERING HYDROSTATIC THRUST BEARING

(71) Applicant: Florida Turbine Technologies, Inc., Jupiter, FL (US)

(72) Inventor: Stephen M Brooks, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 16/375,999

(22) Filed: Apr. 5, 2019

(51) Int. Cl.
*F16C 32/06* (2006.01)
*F01D 25/16* (2006.01)
*F01D 25/22* (2006.01)

(52) U.S. Cl.
CPC ........ *F16C 32/0614* (2013.01); *F01D 25/168* (2013.01); *F01D 25/22* (2013.01); *F16C 32/0692* (2013.01); *F05D 2220/32* (2013.01); *F05D 2240/52* (2013.01); *F05D 2240/53* (2013.01)

(58) Field of Classification Search
CPC .............. F16C 32/0614; F16C 32/0692; F01D 25/168; F01D 25/22; F05D 2220/32; F05D 2240/52; F05D 2240/53
See application file for complete search history.

(56) References Cited

U.S. PATENT DOCUMENTS

| | | | | |
|---|---|---|---|---|
| 3,785,707 A * | 1/1974 | Mitsuoka | ............ | F16C 32/0644 384/121 |
| 3,934,947 A * | 1/1976 | Walter | ................ | F16C 32/0603 384/111 |
| 4,325,583 A * | 4/1982 | McHugh | ................ | F16C 32/064 384/117 |
| 5,042,616 A * | 8/1991 | McHugh | ................. | F01D 25/18 184/6.11 |
| 6,019,515 A * | 2/2000 | Fujii | ................... | F16C 32/0696 384/107 |
| 6,851,862 B2 * | 2/2005 | Gozdawa | ............ | F16C 32/0696 384/121 |
| 8,266,901 B2 * | 9/2012 | Schirle | ...................... | F01D 3/02 60/338 |
| 2018/0320551 A1 * | 11/2018 | Iijima | ....................... | F01D 3/04 |

* cited by examiner

*Primary Examiner* — Thomas R Hannon
(74) *Attorney, Agent, or Firm* — Koenig IP Works, PLLC

(57) ABSTRACT

A self-metering hydrostatic thrust bearing for a small gas turbine engine. The thrust bearing can provide thrust capacity in the fore and aft directions of a hydrostatic thrust bearing using a single source of air. The air supply is directed towards the loaded bearing and away from the unloaded bearing by the self-metering mechanism operated by the thrust load.

1 Claim, 3 Drawing Sheets

SELF-METERING HYDROSTATIC THRUST BEARING

GOVERNMENT LICENSE RIGHTS

This invention was made with Government support under contract number FA8650-16-C-2621 awarded by the US Air Force. The Government has certain rights in the invention.

CROSS-REFERENCE TO RELATED APPLICATIONS

None.

BACKGROUND OF THE INVENTION

Field of the Invention

The present invention relates generally to a thrust bearing on a rotating shaft and more specifically to a self-metering hydrostatic thrust bearing.

Description of the Related Art Including Information Disclosed Under 37 CFR 1.97 and 1.98

Hydrostatic thrust bearings typically operate as two independent units; one bearing for the forward load, one bearing for the aft load. Both bearings are supplied with an air source at all times to handle any shift in thrust loads. In the unloaded position the two bearings push against one another, equalizing their forces. In the loaded position the loaded bearing uses hydrostatic pressure to resist the thrust load, where the unloaded bearing adds to the thrust load since it too has pressure supplied to it. The capacity of the thrust bearing system comes from the fact that the axial gap between the loaded bearing and the rotating component reduces where the unloaded gap increases. This causes the loaded side to experience higher pressures at the static to rotating interface and the unloaded side to experience lower pressures. However, since the unloaded side has a larger gap that also means more air can leak out of that side, thus requiring an orifice upstream on each bearing to prevent the unloaded side from starving the loaded side of air supply. Therefore, if the air supply can be directed towards the loaded bearing and away from the unloaded bearing, it is possible to increase the thrust bearing capacity while simultaneously decreasing the air supply requirement.

BRIEF SUMMARY OF THE INVENTION

A self-metering hydrostatic thrust bearing for a small gas turbine engine. The thrust bearing can provide thrust capacity in the fore and aft directions of a hydrostatic thrust bearing using a single source of air. The air supply is directed towards the loaded bearing and away from the unloaded bearing by the self-metering mechanism operated by the thrust load.

DETAILED DESCRIPTION OF THE INVENTION

Figure 1:
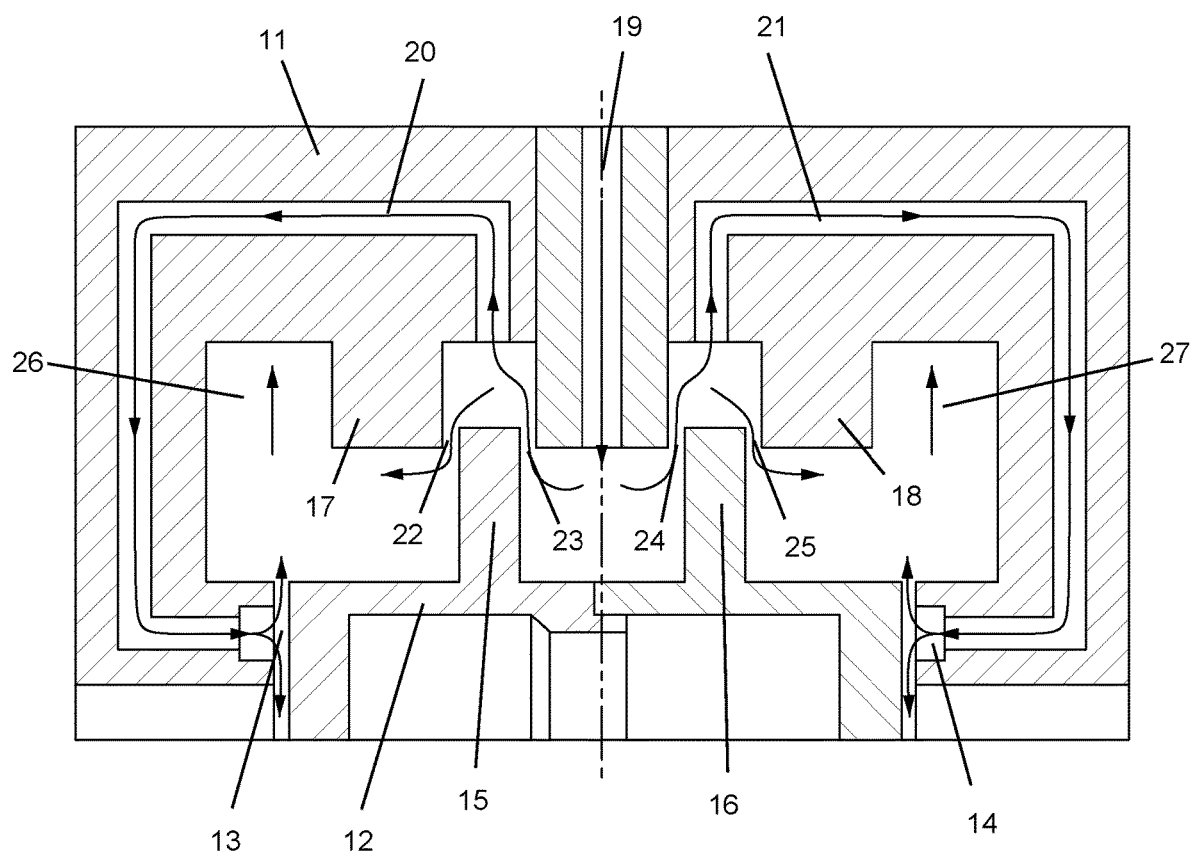
FIG. 1 shows a cross section view of the hydrostatic thrust bearing of the present invention in an unloaded position.

The present invention is self-metering hydrostatic thrust bearing that can be used in a small gas turbine engine. FIG. 1 shows the self-metering hydrostatic thrust bearing with a housing or casing 11, a rotor 12 that rotates within the housing 11 and can shift in an axial direction either forward or aftward within the housing 11, a forward thrust bearing 13, and aft thrust bearing 14, a forward metering plate 15, and aft metering plate 16, a forward metering surface forming piece 17 extending from the housing 11, an aft metering forming surface forming piece 18 extending from the housing 11, and an air supply passage 19 to supply compressed air to the self-metering hydrostatic thrust bearing. The forward metering plate 15 and the aft metering plate 16 and the forward metering surface forming piece 17 and the aft metering forming surface forming piece 18 and the air supply passage 19 forming four metering sections 22 and 23 and 24 and 25 that open or close to regulate air flow to the thrust bearings 13 and 14 depending on the axial shift of the rotor in relation to the housing 11. The metering sections 22-25 show exaggerated gaps for clarity. A forward thrust bearing supply passage 20 and an aft thrust bearing supply passage 21 are both formed in the housing 11 and connect the air supply passage 19 to the respective forward or aft thrust bearings 13 and 14. The forward metering plate 15 and the aft metering plate 16 are both connected to the rotor 12 and thus shift axially along with the rotor 12. A forward vent chamber 26 and an aft vent chamber 27 are formed within the housing 11 to collect the compressed air from the metering gaps and the thrust bearings to discharge from the housing 11.

FIG. 1 shows a flow path for the compressed air through the self-metering hydrostatic thrust bearing where the compressed air from a source (such as a compressor of the gas turbine engine) flows into the air supply passage 19, into a chamber formed between the forward metering plate 15 and the aft metering plate 16, then through the metering sections 23 and 24, and then into the forward thrust bearing air supply passage 20 to the forward thrust bearing 13 and through the aft thrust bearing supply passage 21 to the aft thrust bearing 14. No significant thrust load capacity is available in the FIG. 1 arrangement.

Figure 2:
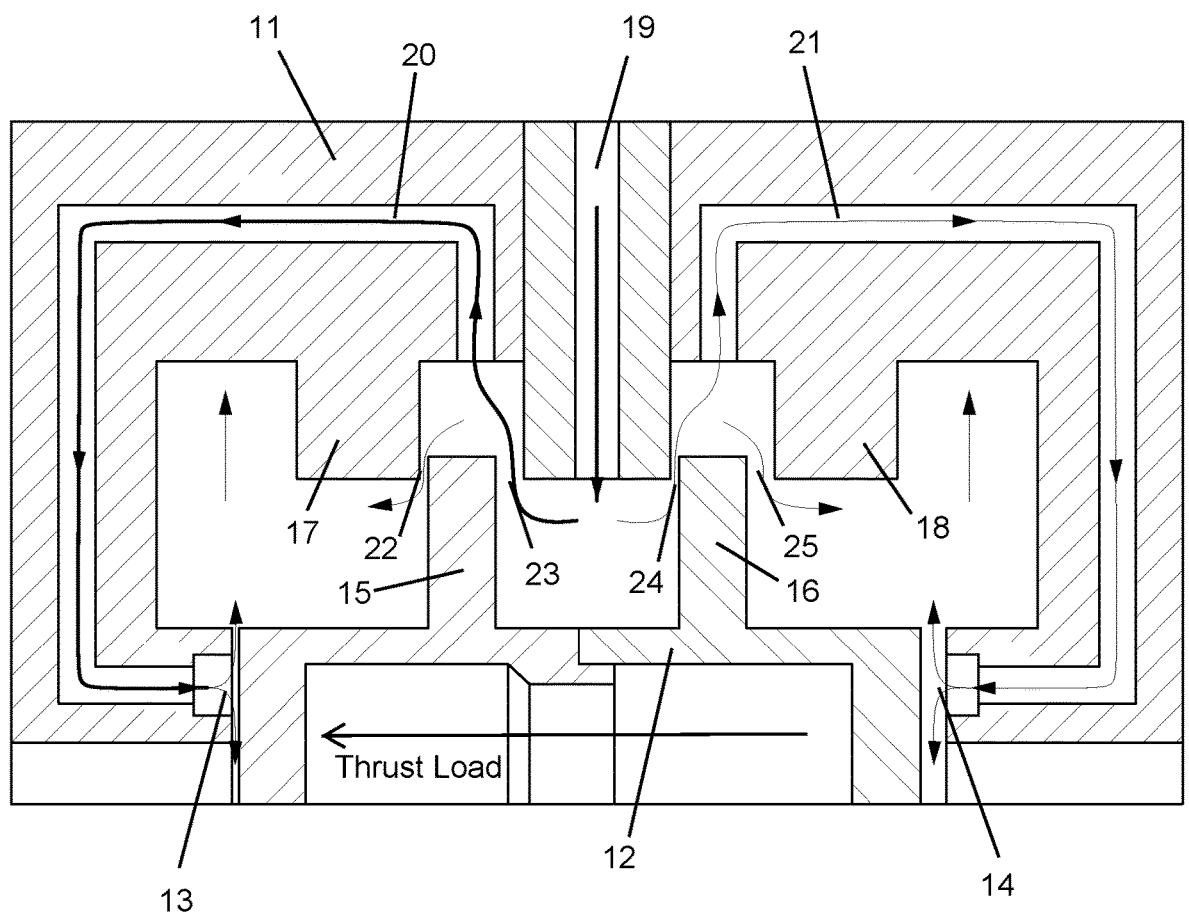
FIG. 2 shows a cross section view of the hydrostatic thrust bearing of the present invention in a loaded position.

When the rotor 12 shifts in an axial direction, the gaps within the four metering sections 22-25 change. FIG. 2 shows the rotor shifted leftward such that the metering gaps 23 and 25 increase while the metering gaps 22 and 24 decrease. In this position, most of the compressed air from the supply passage 19 flows through the wider metering gap 23 and into the forward thrust bearing supply passage 20 to the forward thrust bearing 13 (the loaded side). Metering gap 22 also decreases to force the compressed air from the supply passage 19 to flow into the forward thrust bearing supply passage 20. Metering gap 24 decreases to prevent the compressed air from the air supply passage 19 from flowing into the aft thrust bearing supply passage 21 (the unloaded side). With this arrangement, compressed air is supplied to the forward thrust bearing 13 (the loaded side) and not to the aft thrust bearing 14 (the unloaded side) so that the rotor is shifted from left to right in FIG. 2 to balance the rotor 12 within the housing 11. The compressed air from the metering gaps and the thrust bearings 13 and 14 passes into one of the vent chambers 26 and 27 (see FIG. 1) to be discharged from the housing 11. If the axial load on the rotor 12 was to shift the rotor 12 in the rightward direction of FIG. 2, the metering gaps 22 and 24 would increase while metering gaps 23 and 25 would decrease so that the compressed air from the air supply passage 19 would flow to the aft thrust bearing 14 to shift the rotor in the leftward direction in FIG. 2.

The design of the self-metering hydrostatic thrust bearing of the present invention can provide thrust capability in the fore and aft directions of a hydrostatic thrust bearing using a single source of compressed air. The compressed air supply is directed towards the loaded bearing and away from the unloaded bearing by the self-metering mechanism operated by the thrust load.

Figure 3:
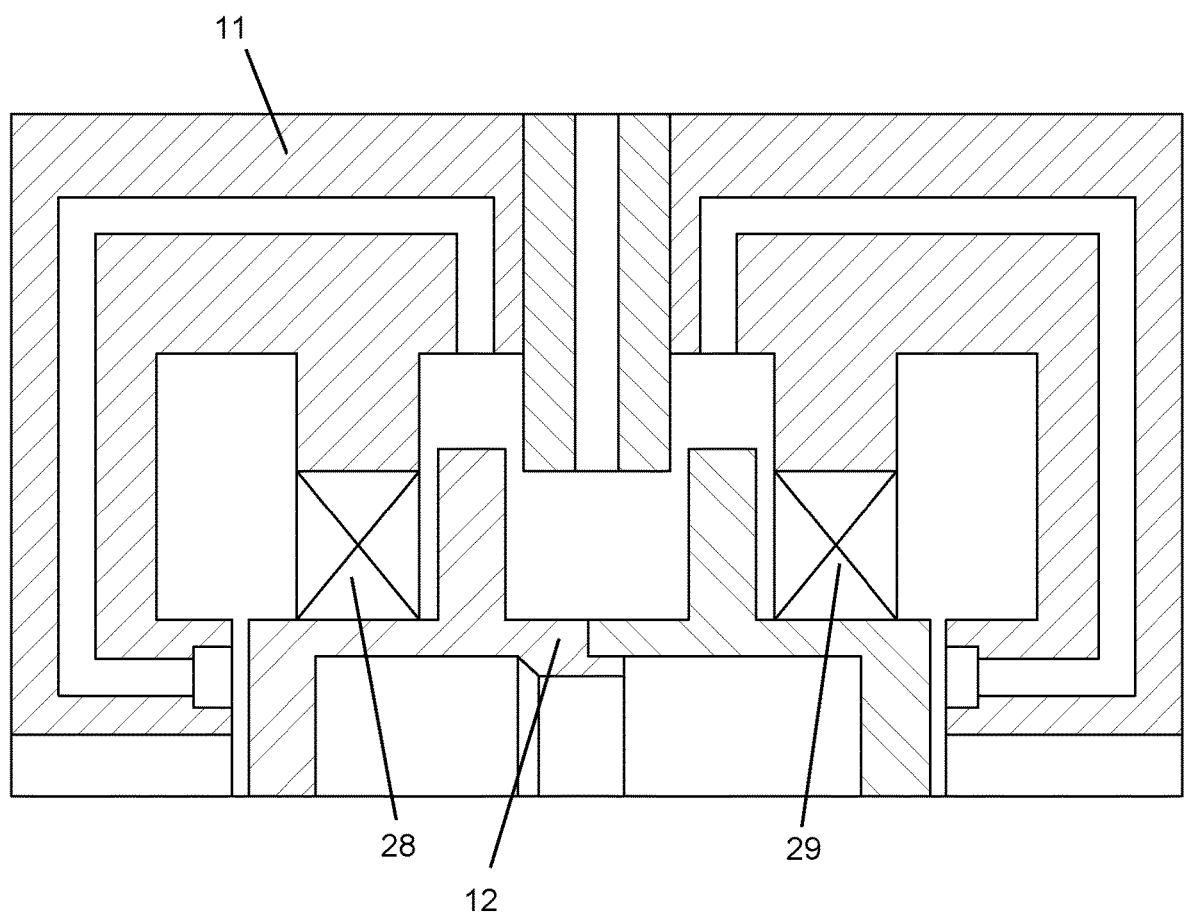
FIG. 3 shows a cross section view of the hydrostatic thrust bearing of the present invention with seals.

FIG. 3 shows the self-metering thrust bearing of FIGS. 1 and 2 with a location of a forward bearing seal 28 and an aft bearing seal 29 each located between a static part of the housing 11 and a rotating part of the rotor 12.

I claim the following:

1. A self-metering hydrostatic thrust bearing comprising:
   a rotor within a housing;
   a forward metering plate and an aft metering plate extending from the rotor;
   a forward metering surface forming piece extending from the housing;
   an aft metering surface forming piece extending from the housing;
   a compressed air supply passage opening into a chamber formed between the forward metering plate and the aft metering plate;
   a first metering gap formed between the forward metering forming piece and the forward metering plate;
   a second metering gap formed between the forward metering plate and the compressed air supply passage;
   a third metering gap formed between the compressed air supply passage and the aft metering plate;
   a fourth metering gap formed between the aft metering plate and the aft metering surface forming piece;
   a forward hydrostatic thrust bearing;
   an aft hydrostatic thrust bearing;
   a forward thrust bearing supply passage connected between the second metering gap and the forward hydrostatic thrust bearing; and,
   an aft thrust bearing supply passage connected between the third metering gap and the aft hydrostatic thrust bearing; wherein,
   axial movement of the rotor leftward increases the second and fourth metering gaps while decreasing the first and third metering gaps such that the rotor is shifted rightward to balance the rotor within the housing; and,
   axial movement of the rotor rightward increases the first and third metering gaps while decreasing the second and fourth metering gaps such that the rotor is shifted leftward to balance the rotor within the housing.

* * * * *